(12) United States Patent
You et al.

(10) Patent No.: US 10,374,957 B2
(45) Date of Patent: Aug. 6, 2019

(54) TRAFFIC CONTROL METHOD AND APPARATUS

(71) Applicant: ZTE CORPORATION, Shenzhen (CN)

(72) Inventors: Mingli You, Shenzhen (CN); Bingchen Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 42 days.

(21) Appl. No.: 15/738,255

(22) PCT Filed: Jun. 24, 2016

(86) PCT No.: PCT/CN2016/087107
§ 371 (c)(1),
(2) Date: Dec. 20, 2017

(87) PCT Pub. No.: WO2017/000845
PCT Pub. Date: Jan. 5, 2017

(65) Prior Publication Data
US 2018/0183712 A1    Jun. 28, 2018

(30) Foreign Application Priority Data

Jun. 30, 2015  (CN) .......................... 2015 1 0374615

(51) Int. Cl.
*H04L 12/803*  (2013.01)
*H04L 12/703*  (2013.01)
*H04L 12/707*  (2013.01)
(52) U.S. Cl.
CPC ............ *H04L 47/125* (2013.01); *H04L 45/24* (2013.01); *H04L 45/28* (2013.01)
(58) Field of Classification Search
None
See application file for complete search history.

(56) References Cited

U.S. PATENT DOCUMENTS 6,275,503 B1    8/2001  Driscoll
7,831,745 B1    11/2010 Eiriksson
(Continued)

FOREIGN PATENT DOCUMENTS

CN    101272290 A    9/2008
CN    101420384 A    4/2009
(Continued)

OTHER PUBLICATIONS

International Search Report in international application No. PCT/CN2016/087107, dated Sep. 26, 2016.
(Continued)

*Primary Examiner* — Hassan A Phillips
*Assistant Examiner* — Gautam Sharma
(74) *Attorney, Agent, or Firm* — Oppedahl Patent Law Firm LLC

(57) ABSTRACT

Disclosed are a traffic control method and apparatus. According to the method, the number n of pieces of traffic to be divided is determined, n being greater than or equal to 2. All available traffic is divided into n pieces. Each piece of the traffic is the same as each other or differs from each other by one unit. N pieces of traffic are allocated to m equivalent paths so that each of equivalent paths is allocated with n/m or n/m+1 pieces of traffic. In a traffic allocation process, each of equivalent paths records the traffic allocated to itself and an allocation order of the traffic. When it is required to perform traffic switching, allocation is performed according to the allocated traffic and the allocation order thereof which are recorded by each of equivalent paths in a manner of first allocating last allocated traffic to an equivalent path in need, so that the number of pieces of traffic allocated to each of the equivalent paths is finally the same as each other or differs from each other by one piece.

15 Claims, 13 Drawing Sheets

(56) References Cited

U.S. PATENT DOCUMENTS

| | | |
|---|---|---|
| 7,945,705 B1 | 5/2011 | Eiriksson |
| 8,982,689 B2 | 3/2015 | Allan |
| 2007/0263717 A1 | 11/2007 | Busch |
| 2009/0262646 A1 | 10/2009 | Ramakrishnan |
| 2011/0142041 A1 | 6/2011 | Imai |
| 2013/0279323 A1 | 10/2013 | Allan |
| 2014/0016502 A1 | 1/2014 | Miyamoto |
| 2016/0112299 A1 | 4/2016 | Li |

FOREIGN PATENT DOCUMENTS

| | | |
|---|---|---|
| CN | 101499957 A | 8/2009 |
| CN | 101674224 A | 3/2010 |
| CN | 103078804 A | 5/2013 |
| CN | 104022952 A | 9/2014 |
| CN | 104144120 A | 11/2014 |
| CN | 104396197 A | 3/2015 |
| EP | 2690835 A1 | 1/2014 |
| GB | 2432989 A | 6/2007 |
| JP | 2015012343 A | 1/2015 |

OTHER PUBLICATIONS

English Translation of the Written Opinion of the International Search Authority in international application No. PCT/CN2016/087107, dated Sep. 26, 2016.

Supplementary European Search Report in European application No. 16817209.6, dated May 24, 2018.

TRAFFIC CONTROL METHOD AND APPARATUS

TECHNICAL FIELD

The disclosure relates to, but is not limited to traffic control, and in particular to a traffic control method and apparatus.

BACKGROUND

In a conventional routing technology, if there is an application scenario where multiple different paths reach the same destination address, data packets sent to the destination address can only use one of the multiple paths, and the other paths are in a backup state or an invalid state. Thus, path resources are idle and wasted. Even in a dynamical routing environment, mutual switching also requires some time.

By means of an Equal-Cost Multipath (ECMP) technology, layer 3 forwarding traffic sent to the same IP or the same destination network segment is shared through different paths, thereby realizing the load balancing of a network.

Traffic is generally classified based on a manner of stream in ECMP, and a hash method is usually used for selecting a path. In the ECMP technology of the related art, after a certain path is failed, it is required to hash again, so that the traffic is normally allocated on all normal paths. This processing method would thoroughly disrupt the traffic of all paths, and then reallocate it, thereby influencing the efficiency of traffic allocation and a subsequent traffic recovery process.

SUMMARY

The following is an overview of the theme elaborated in this application. The overview is not intended to limit the scope of protection of the claims.

The disclosure provides a traffic control method and apparatus, which can minimize an impact on a normal path during traffic switching.

The disclosure provides a traffic control method. The number n of pieces of traffic to be divided is determined, n being greater than or equal to 2. All available traffic is divided into n pieces and each piece of the traffic is the same or differs by one unit. N pieces of traffic are allocated to m equivalent paths so that each of the equivalent paths is allocated with n/m or n/m+1 pieces of traffic. In a traffic allocation process, each of the equivalent paths records the traffic allocated to itself and an allocation order of the traffic. When it is required to perform traffic switching, allocation is performed according to the traffic allocated to the equivalent path and the allocation order of the traffic which are recorded by each of the equivalent paths in a manner of first allocating last allocated traffic to an equivalent path in need, so that the number of pieces of traffic allocated to each of the equivalent paths is the same as each other or differs from each other by one piece.

In an exemplary embodiment, when any path of multiple equivalent paths is failed, the traffic on the failed path is allocated to normal path(s). The number of pieces of traffic allocated to the normal path(s) is the same or differs by one piece of traffic. The original traffic of the normal path(s) is maintained unchanged, and each of the normal path(s) records the traffic allocated from the failed part to itself and the allocation order of the allocated traffic.

In an exemplary embodiment, after the failed path is recovered, the normal path(s) allocated with the traffic of the failed path allocates the traffic allocated from the failed path to the failed path which has recovered according to the recorded traffic allocated from the failed path and the recorded allocation order of the allocated traffic.

In an exemplary embodiment, when an equivalent path is added, each of the original equivalent path(s) allocates the last allocated traffic to the added equivalent path according to the recorded traffic allocated to itself and the recorded allocation order of the traffic. The number of pieces of traffic allocated to the added equivalent path by each of the original equivalent path(s) is the same or differs by one piece of traffic, until the number of pieces of traffic allocated to the added equivalent path is the same as or differs from the number of pieces of traffic allocated to each of the original equivalent path(s) by one piece.

In an exemplary embodiment, the Least Common Multiple (LCM) of all possible values in the variation range of the number of equivalent paths is taken as the number n of pieces of traffic to be divided. The variation range of the number of equivalent paths is a set of all possible values of the number of equivalent paths which can work.

In an exemplary embodiment, all available traffic is divided into n pieces according to a preset rule. The preset rule is any rule that can make each piece of the traffic the same or differ by one unit.

In an exemplary embodiment, the preset rule is values corresponding to addresses of all messages to be forwarded. The values corresponding to the addresses of all the messages to be forwarded and the determined number of pieces of traffic are remaindered, and all the traffic with the same remainder is classified into one piece.

In an exemplary embodiment, the addresses are a source IP address, or a destination IP address, or a source Media Access Control (MAC) address, or a destination MAC address.

In an exemplary embodiment, the preset rule is protocol types. The traffic for each of the protocol types is divided into n pieces.

In an exemplary embodiment, one piece of traffic is allocated to one of the equivalent paths each time in order. When all the equivalent paths are allocated, the same allocating process is repeated until each of the equivalent paths is allocated with n/m or n/m+1 pieces of traffic. N/m or n/m+1 pieces of traffic, which should be carried by each of the equivalent paths, are allocated to the corresponding equivalent path once.

In an exemplary embodiment, all the m equivalent paths are strung into a loop. Each node in the loop represents one equivalent path. The traffic allocated to each of the equivalent paths and the allocation order thereof are recorded into the corresponding node. Correspondingly, when any path of the multiple equivalent paths is failed, the node corresponding to the failed path is deleted from the loop, and then the traffic on the failed path is allocated to the normal path(s). After the failed path is recovered, the node corresponding to the recovered path is added into the loop, and then the traffic allocated from the failed path is allocated to the path which has recovered. When an equivalent path is added, the node corresponding to the added equivalent path is added into the loop, and then each of the original equivalent path(s) allocates the last allocated traffic to the added equivalent path according to the recorded traffic allocated to itself and the recorded allocation order of the traffic.

In an exemplary embodiment, a stack structure is adopted to record the traffic allocated to each of the equivalent paths and the allocation order of the traffic. The traffic is arranged according to a sequence of being allocated to each of the equivalent paths or each of the normal paths. The first allocated traffic is at the stack bottom, and the last allocated traffic is at the stack top. When any path of the multiple equivalent paths is failed, the traffic of the stack top on the failed path is allocated to the normal path(s), until the number of pieces of traffic allocated to each of the normal path(s) is the same or differs by one piece. After the failed path is recovered, the normal path allocated with the traffic of the failed path allocates the traffic of its own stack top to the failed path which is recovered, and allocates the traffic allocated from the failed path to the failed path which is recovered, until all the traffic allocated from the failed path is allocated to the path which is recovered. When an equivalent path is added, each of the original equivalent paths allocates the traffic of its stack top to the added equivalent path, until the number of pieces of traffic allocated to the added equivalent path is the same as or differs from the number of pieces of traffic allocated to each of the original equivalent paths by one piece.

The disclosure also provides a traffic control apparatus including a number of pieces of traffic determining module, a traffic dividing module, a traffic allocating module, a traffic information recording module and a traffic control module. The number of pieces of traffic determining module is configured to determine the number n of pieces of traffic to be divided and n is greater than or equal to 2. The traffic dividing module is configured to divide all available traffic into n pieces. Each piece of the traffic is the same or differs by one unit. The traffic allocating module is configured to allocate n pieces of traffic to m equivalent paths so that each of the equivalent paths is allocated with n/m or n/m+1 pieces of traffic. The traffic information recording module is configured to record the traffic allocated to each of equivalent paths and the allocation order of pieces of traffic in the traffic allocation process. The traffic control module is configured to, when it is required to perform traffic switching, perform, according to the allocated traffic and the allocation order of the traffic which are recorded by the traffic information recording module, allocation in a manner of first allocating the last allocated traffic to an equivalent path in need, so that the number of pieces of traffic allocated to each of the equivalent paths is the same or differ by one piece.

In an exemplary embodiment, the traffic control module is configured to, when any path of multiple equivalent paths is failed, allocate the traffic on the failed path to the normal paths, wherein the number of pieces of traffic allocated to each of the normal paths is the same or differs by one piece of traffic. The original traffic of each of the normal paths is maintained unchanged, and at the same time, the traffic information recording module is notified to record the traffic allocated from the failed part to each of the normal paths and the allocation order of the allocated traffic.

In an exemplary embodiment, the traffic control module is further configured to, after the failed path is recovered, allocate the traffic allocated from the failed path to the failed path which has recovered according to the traffic allocated from the failed path to the normal paths and the allocation order of the allocated traffic which are recorded by the traffic information recording module.

In an exemplary embodiment, when an equivalent path is added, the original equivalent path allocates the last allocated traffic to the added equivalent path according to the traffic allocated to itself and the allocation order of the traffic which are recorded by the traffic information recording module. The number of pieces of traffic allocated to the added equivalent path by the original equivalent path is the same or differs by one piece of traffic, until the number of pieces of traffic allocated to the added equivalent path is the same as or differs from the number of pieces of traffic allocated to the original equivalent path by one piece.

In an exemplary embodiment, the number of pieces of traffic determining module is configured to take the LCM of all possible values in the variation range of the number of equivalent paths as the number n of pieces of traffic to be divided. The variation range of the number of equivalent paths is the set of all possible values of the number of equivalent paths which can work.

In an exemplary embodiment, the traffic dividing module is configured to divide all available traffic into n pieces according to the preset rule. The preset rule is any rule that can make each piece of the traffic the same or differ by one unit.

In an exemplary embodiment, the traffic allocating module is configured to allocate one piece of traffic to one equivalent path each time in order; and when all the equivalent paths are allocated with the same number of pieces of traffic, repeat the same allocating process until each of the equivalent paths is allocated with n/m or n/m+1 pieces of traffic. Alternatively, n/m or n/m+1 pieces of traffic, which should be carried by each of the equivalent paths, are allocated to the corresponding equivalent path once.

In an exemplary embodiment, the traffic information recording module is configured to string all the m equivalent paths into a loop. Each node in the loop represents an equivalent path, and the traffic allocated to each of the equivalent paths and the allocation order of the traffic are recorded into the corresponding node. Correspondingly, the traffic control module is further configured to, when any path of the multiple equivalent paths is failed, delete the node corresponding to the failed path from the loop, after the failed path has returned to normal, add the node corresponding to the path which has recovered in the loop, and when an equivalent path is added, add the node corresponding to the added equivalent path in the loop.

In an exemplary embodiment, the traffic information recording module is configured to adopt the stack structure to record the traffic allocated to each of the equivalent paths and the allocation order of the traffic. That is, for each of the equivalent paths, according to the sequence of allocated traffic, the first allocated traffic is at the stack bottom, and the last allocated traffic is at the stack top. The traffic control module is configured to, when any path of the multiple equivalent paths is failed, allocate the traffic of the stack top on the failed path to the normal path each time, until the number of pieces of traffic allocated to each of the normal paths is the same or differs by one piece of traffic. The traffic control module is configured to, after the failed path is recovered, allocate the traffic of the stack top of the normal paths to the failed path which has recovered, according to the traffic allocated from the failed path to the normal paths and the allocation order of the allocated traffic which are recorded by the traffic information recording module 1104, until all the traffic allocated from the failed path is allocated to the path which has recovered.

The traffic control module is configured to, when an equivalent path is added, cause the original equivalent paths to allocate the traffic of their stack tops to the added equivalent path each time according to the traffic allocated to the original equivalent paths and the allocation order of the traffic which are recorded by the traffic information recording module, until the number of pieces of traffic allocated to the added equivalent path is the same as or differs from the number of pieces of traffic allocated to the original equivalent paths by one piece.

The disclosure also provides a computer readable storage medium having computer executable instructions stored therein. The computer executable instructions implement the above methods when being executed by a processor.

With the above technical solutions, an impact on the normal path can be minimized during traffic switching.

Other aspects can be understood after the accompanying drawings and detailed descriptions are read and understood.

DETAILED DESCRIPTION

The implementation modes of the disclosure are elaborated below in combination with the accompanying drawings and embodiments.

It is noted that, the embodiments and features in the embodiments of the disclosure can be combined with each other if not conflicting, which should fall within the scope of protection of the disclosure. In addition, although a logical sequence is shown in the flowchart, in some cases, the presented or described steps can be performed in an order different from that herein.

The embodiments of the disclosure adopt the technical solutions as follows.

Figure 1:
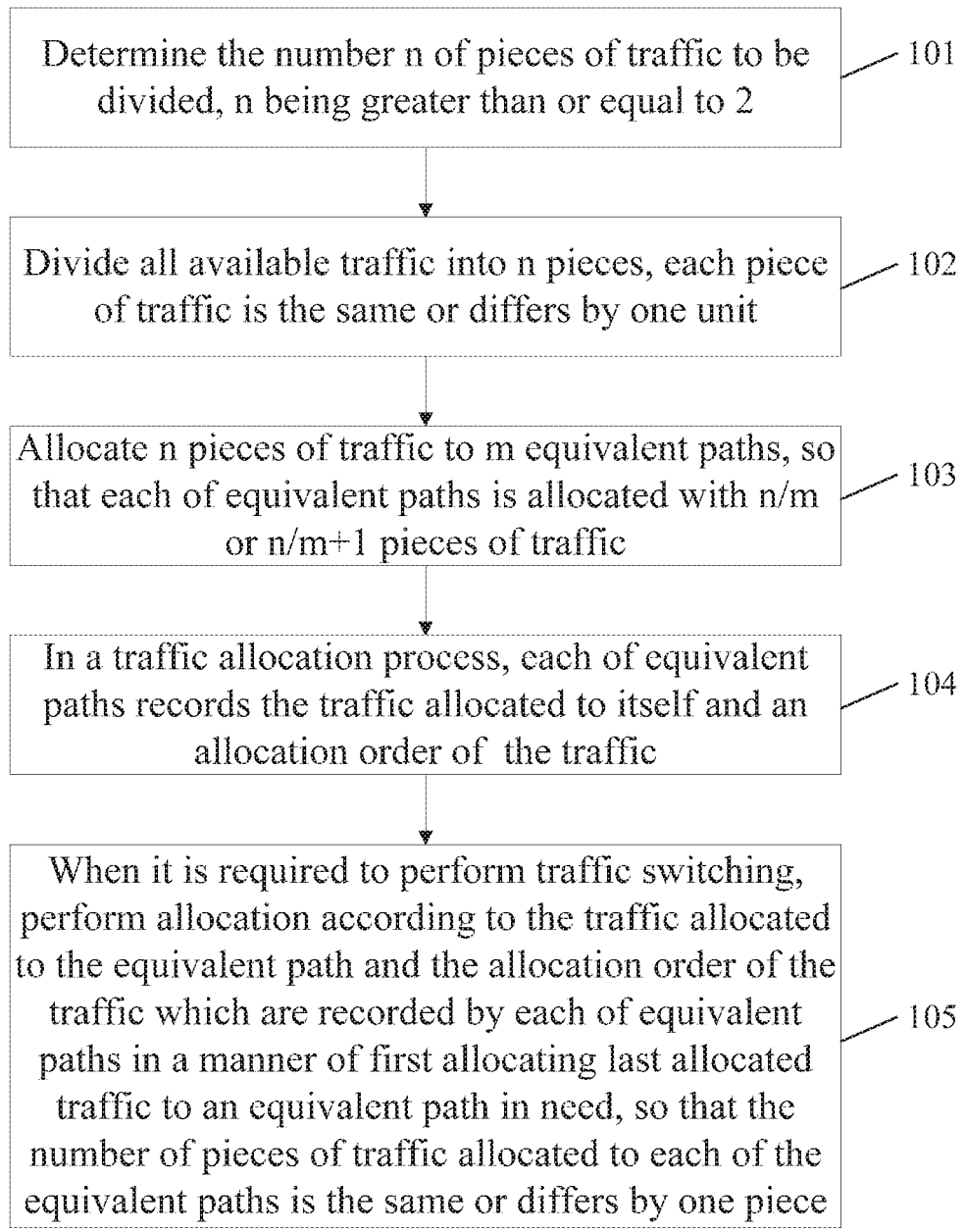
FIG. 1 is a flowchart showing a traffic control method according to the disclosure.

A traffic allocation method according to the embodiments of the disclosure can be applied to either an ECMP system or other similar systems. As shown in FIG. 1, the method includes the following steps.

At step 101, the number n of pieces of traffic to be divided is determined. Herein, n is greater than or equal to 2.

At step 102, all available traffic is divided into n pieces. Each piece of the traffic is the same as each other or differs from each other by one unit.

At step 103, n pieces of traffic are allocated to m equivalent paths so that each of the equivalent paths is allocated with n/m or n/m+1 pieces of traffic.

At step 104, each of the equivalent paths records the traffic allocated to itself and an allocation order of the traffic in a traffic allocation process.

At step 105, when it is required to perform traffic switching, allocation is performed according to the traffic allocated to the equivalent path and the allocation order of the traffic which are recorded by each of the equivalent paths in a manner of first allocating last allocated traffic to the equivalent path in need, so that the number of pieces of traffic allocated to each of the equivalent paths is the same or differs by one piece.

In an exemplary embodiment, the step 105 includes the following steps.

At step 1051, when any path of multiple equivalent paths is failed, the traffic on the failed path is allocated to normal paths, wherein the number of pieces of traffic allocated to each of the normal paths is the same or differs by one piece of traffic.

At step 1052, the original traffic of each of the normal paths is maintained unchanged. Also, each of the normal paths records the traffic allocated from the failed part to itself and the allocation order of the allocated traffic.

In an exemplary embodiment, the step 105 further includes the following step.

At step 1053, after the failed path returned to normal, the normal paths allocated with the traffic of the failed path allocates the traffic allocated from the failed path to the failed path which has returned to normal according to the recorded traffic allocated from the failed path to itself and the recorded allocation order of the allocated traffic.

In an exemplary embodiment, the step 105 further includes the following step.

At step 1051', when an equivalent path is added, each of the original equivalent paths allocates the last allocated traffic to the added equivalent path according to the recorded traffic allocated to itself and the recorded allocation order of the traffic. The number of pieces of traffic allocated to the added equivalent path by each of the original equivalent paths is the same or differs by one piece of traffic, until the number of pieces of traffic allocated to the added equivalent path is the same as or differs from the number of pieces of traffic allocated to each of the original equivalent paths by one piece.

In an exemplary embodiment, determining the number n of pieces of traffic to be divided in the step 101 includes that the number n of pieces of traffic to be divided is determined according to an experiment value. The number of pieces of traffic enables the traffic to be allocated to multiple equivalent paths as evenly as possible. The embodiment is applied to a situation where the number m of equivalent paths is not determined or difficult to be determined.

In an exemplary embodiment, determining the number n of pieces of traffic to be divided in the step 101 includes that the LCM of all possible values in the variation range of the number of equivalent paths is taken as the number n of pieces of traffic to be divided.

Herein, the variation range of the number of equivalent paths is a set of all possible values of the number of equivalent paths which can work. For example, the variation range (2, 3, 4, 5) of the number of equivalent paths represents that the number of paths which can work may be 2, 3, 4 or 5. If there are 10 equivalent paths, the number of equivalent paths which can work should be 10. However, when the path is failed, the number of equivalent paths which can work will probably decrease. The maximum number of failed apparatus that can be allowed is fixed. When the number of equivalent paths decreases a lot, the system may have been broken down, and it is not required to perform traffic switching. Accordingly, there is a limit to the reduction in the number of equivalent paths which can work, and the variation range of the number of equivalent paths generally can be determined. In some cases, extra equivalent paths which can work are configured. Therefore, for a situation where there are 10 equivalent paths and a maximum of two paths are allowed to be failed, the variation range of the number of equivalent paths can be (8, 9, 10). That is, the number of working paths can be 8, or 9, or 10. When the number of equivalent paths which can work is 8, there are two equivalent paths failed. The variation range of the number of equivalent paths can also be (8, 9, 10, 11, 12), which means that two extra equivalent paths which can work are configured.

If the variation range of the number of equivalent paths is (n, n+1 . . . n+m), the LCM of all possible values from n to n+m is taken as the number of pieces of traffic to be divided, so that absolutely even allocation of the traffic can be ensured. For example, if the variation range of the number of equivalent paths is (1, 2, 3, 4), the LCM 12 of the four possible values 1, 2, 3 and 4 is taken as the number of pieces of traffic to be divided. The manner of taking the LCM of all possible values in the variation range of the number of equivalent paths as the number n of pieces of traffic to be divided is applied to a situation where the number of equivalent paths is fixed or predictable. For example, for the networks of most companies, the number of equivalent paths is determined, or is at least in a certain range.

In an exemplary embodiment, the step 102 includes that all available traffic is divided into n pieces according to a preset rule, wherein the preset rule is any rule that can make each piece of the traffic the same or differ by one unit.

In an exemplary embodiment, the preset rule is values corresponding to addresses of all messages to be forwarded.

In an exemplary embodiment, the operation that all available traffic is divided into n pieces according to the preset rule includes that the values corresponding to the addresses of all the messages to be forwarded and the determined number of pieces of traffic are remaindered, and all the traffic with the same remainder is classified into one piece.

In an exemplary embodiment, the addresses can be a source IP address, or a destination IP address, or a source MAC address, or a destination MAC address.

In an exemplary embodiment, the preset rule can also be protocol types.

In an exemplary embodiment, the operation that all available traffic is divided into n pieces according to the preset rule includes that the traffic is divided into n pieces with respect to each of the protocol types.

The above preset rules can be combined randomly. For example, when the traffic is divided, both the protocol types and the source IP address, the destination IP address, the source MAC address and the destination MAC address can be taken into consideration. As long as the preset rules can make each piece of the traffic the same or differ by one unit, they can be applied to the embodiment of the disclosure.

For example, when the values corresponding to the addresses of all the messages to be forwarded and the determined number of pieces of traffic are remaindered, and all the traffic with the same remainder is classified into one piece, the values corresponding to the source IP addresses of all the messages to be forwarded include 12 to 47. Herein, the value 0 gotten by remaindering the values 12, 24 and 36 corresponding to the source IP addresses and the determined number of pieces of traffic is classified into one piece, the value 1 gotten by remaindering the values 13, 25 and 37 corresponding to the source IP addresses and the determined number of pieces of traffic is classified into one piece, and so on, until the value 11 gotten by remaindering the values 23, 35 and 47 corresponding to the source IP addresses and the determined number of pieces of traffic is classified into one piece.

The step 103 includes that one piece of traffic is allocated to one equivalent path each time by circularly allocating in order; and when all the equivalent paths are allocated with the same number of pieces of traffic, the same allocating process is repeated until each of the equivalent paths is allocated with n/m or n/m+1 pieces of traffic. For example, if all available traffic is divided into 12 pieces, when the traffic is allocated by circularly allocating in order, the traffic with the remainder 0 is allocated to the first equivalent path, the traffic with the remainder 1 is allocated to the second equivalent path, the traffic with the remainder 2 is allocated to the third equivalent path, and the traffic with the remainder 3 is allocated to the fourth equivalent path. At this point, all the equivalent paths are allocated with one piece of traffic. The same allocation process is repeated, and the traffic with the remainder 4 is allocated to the first equivalent path, and so on, until all the fourth equivalent paths include 12/4=3 pieces of traffic, as shown in Table 1 below.

TABLE 1

| Mode of circularly allocating in order | | |
| --- | --- | --- |
| Path | The number of pieces of traffic allocated to each of the paths | Traffic allocated to each of the paths (represented by remainders) |
| Equivalent path 1 | 3 | 0, 4, 8 |
| Equivalent path 2 | 3 | 1, 5, 9 |
| Equivalent path 3 | 3 | 2, 6, 10 |
| Equivalent path 4 | 3 | 3, 7, 11 |

Alternatively, nm or n/m+1 pieces of traffic, which should be carried by each of the equivalent paths, are allocated to the corresponding equivalent path once by using a method of allocating the number of pieces of traffic, which should be carried by the equivalent path, to each of the equivalent paths once. For example, three pieces of traffic with the remainders 0, 1 and 2 are allocated to the first equivalent path once, three pieces of traffic with the remainders 3, 4 and 5 are allocated to the second equivalent path once, three pieces of traffic with the remainders 6, 7 and 8 are allocated to the third equivalent path once, and three pieces of traffic with the remainders 9, 10 and 11 are allocated to the fourth equivalent path once.

TABLE 2

| Mode of completing allocation once | | |
| --- | --- | --- |
| Path | The number of pieces of traffic allocated toeach of paths | Traffic allocated to each of paths (represented by remainders) |
| Equivalent path 1 | 3 | 0, 1, 2 |
| Equivalent path 2 | 3 | 3, 4, 5 |
| Equivalent path 3 | 3 | 6, 7, 8 |
| Equivalent path 4 | 3 | 9, 10, 11 |

The step 104 includes that all the m equivalent paths are strung into a loop, wherein each of nodes in the loop represents one of the equivalent paths, and the traffic allocated to each of the equivalent paths and the allocation order of the traffic are recorded into the corresponding node.

Correspondingly, in the step 1051, when any path of the multiple equivalent paths is failed, the node corresponding to the failed path is deleted from the loop, and then the traffic on the failed path is allocated to the normal path.

In the step 1053, after the failed path has returned to normal, the node corresponding to the path which has returned to normal is added in the loop, and then the traffic allocated from the failed path is allocated to the path which has returned to normal.

In the step 1051', when an equivalent path is added, the node corresponding to the added equivalent path is added in the loop, and then the original equivalent path allocates the last allocated traffic to the added equivalent path according to the traffic allocated to it and the allocation order of the traffic which are recorded.

Both the step 104 and the step 1052 include that a stack structure is adopted to record the traffic allocated to each of the equivalent paths and the allocation order of the traffic. That is, the traffic is arranged according to a sequence of being allocated to each of the equivalent paths, wherein the first allocated traffic is at the stack bottom, and the last allocated traffic is at the stack top.

That when any path of the multiple equivalent paths is failed, the traffic on the failed path is allocated to the normal path in the step 1051, that after the failed path has returned to normal, the normal path allocated with the traffic of the failed path allocates the traffic allocated from the failed path to the failed path which has returned to normal according to the traffic allocated from the failed path to it and the allocation order of the allocated traffic which are recorded in the step 1053, and that when an equivalent path is added, the original equivalent path allocates the last allocated traffic to the added equivalent path according to the traffic allocated to it and the allocation order of the traffic which are recorded in the step 1051' include that the stack structure is adopted to allocate the traffic to the normal path(s), the failed path which has returned to normal or the added equivalent path.

That is, when any path of the multiple equivalent paths is failed, the traffic of the stack top on the failed path is allocated to the normal paths, until the number of pieces of traffic allocated to each of the normal paths is the same or differs by one piece.

After the failed path has returned to normal, the normal path allocated with the traffic of the failed path allocates the traffic of its own stack top to the failed path which has returned to normal, and allocates the traffic allocated from the failed path to the failed path which has returned to normal, until all the traffic allocated from the failed path is allocated to the path which has returned to normal.

When an equivalent path is added, each of the original equivalent paths allocates the traffic of its stack top to the added equivalent path, until the number of pieces of traffic allocated to the added equivalent path is the same as or differs from the number of pieces of traffic allocated to each of the original equivalent paths by one piece.

The above implementation modes can be combined randomly.

The implementation of the disclosure is elaborated below through several application examples.

APPLICATION EXAMPLE ONE

When the number m of equivalent paths is not determined or difficult to be determined, the number n of pieces of traffic to be divided is determined as 10 according to an ordinary comprehensive situation.

All available traffic is divided into 10 pieces and the number of IP addresses included in each piece of traffic is the same or differs by one. For example, each piece of traffic includes 5 IP addresses.

The 10 pieces of traffic are allocated to 3 equivalent paths by using circularly allocating in order, wherein the number of the equivalent paths can only be determined in a network use process. In the network use process, the first piece of traffic a is allocated to the first equivalent path, the second piece of traffic b is allocated to the second equivalent path, the third piece of traffic c is allocated to the second equivalent path, and so on, until the tenth piece of traffic j is allocated to the first equivalent path. A traffic allocation table is shown in Table 3 below.

TABLE 3

| | Mode of circularly allocating in order | |
|---|---|---|
| Path | The number of pieces of traffic allocated to each of the paths | Traffic allocated to each of the paths (not represented by remainders) |
| Equivalent path 1 | 4 | a, d, g, j |
| Equivalent path 2 | 3 | b, e, h |
| Equivalent path 3 | 3 | c, f, i |

The 10 pieces of traffic are allocated to 3 equivalent paths by completing allocation once, wherein the number of the equivalent paths can only be determined in the network use process. In the network use process, the first piece of traffic a, the second piece of traffic b, the third piece of traffic c and the fourth piece of traffic d are allocated to the first equivalent path once. The fifth piece of traffic e, the sixth piece of traffic f and the seventh piece of traffic g are allocated to the second equivalent path once. The eighth piece of traffic h, the ninth piece of traffic i and the tenth piece of traffic j are allocated to the third equivalent path once. A traffic allocation table is shown in Table 4 below. Alternatively, the second equivalent path is allocated with 4 pieces of traffic, and the first equivalent path and the third equivalent path are allocated with 3 pieces of traffic. Alternatively, the third equivalent path is allocated with 4 pieces of traffic, and the first equivalent path and the second equivalent path are allocated with 3 pieces of traffic.

TABLE 4

| | Mode of completing allocation once | |
|---|---|---|
| Path | The number of pieces of traffic allocated to each of paths | Traffic allocated to each of paths (not represented by remainders) |
| Equivalent path 1 | 4 | a, b, c, d |
| Equivalent path 2 | 3 | e, f, g |
| Equivalent path 3 | 3 | h, j, j |

Figure 2:
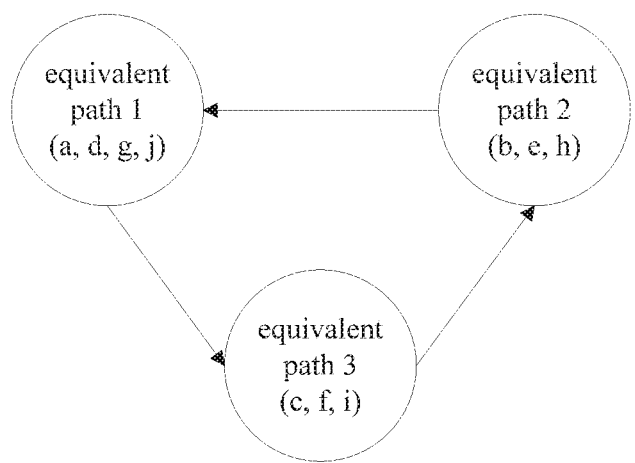
FIG. 2 is a schematic diagram 1 of a loop processing mode and a stack structure processing mode according to the disclosure.

In the traffic allocation process, each of the equivalent paths records the traffic allocated to it and the allocation order of the traffic. The above loop processing mode can be adopted. When the traffic is allocated by circularly allocating in order, as shown in FIG. 2, the equivalent paths 1, 2 and 3 are strung into a loop, wherein each node in the loop represents an equivalent path, and the traffic allocated to each of the equivalent paths and the allocation order of the traffic are recorded into the corresponding node.

Figure 3:
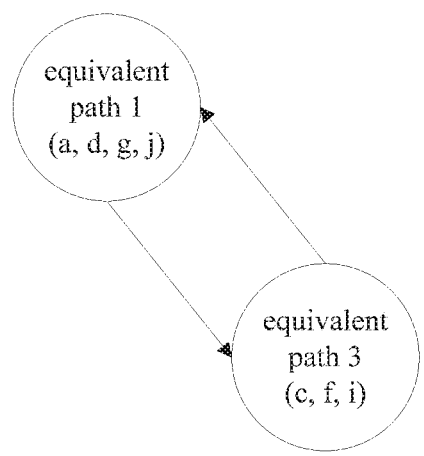
FIG. 3 is a schematic diagram 2 of a loop processing mode and a stack structure processing mode according to the disclosure.
Figure 4:
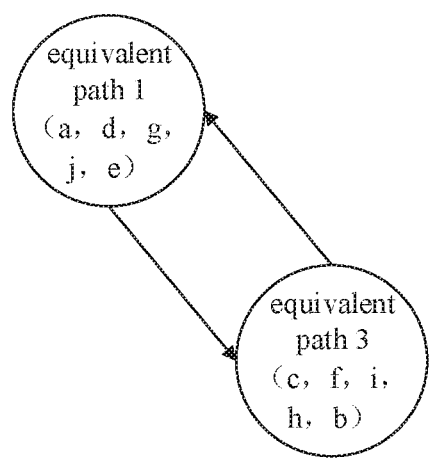
FIG. 4 is a schematic diagram 3 of a loop processing mode and a stack structure processing mode according to the disclosure.
Figure 5:
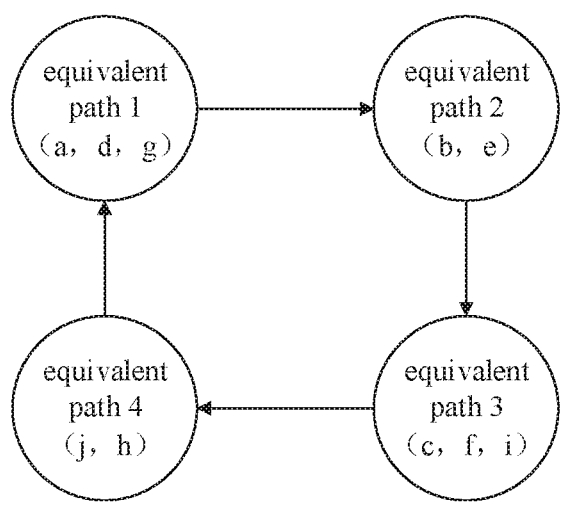
FIG. 5 is a schematic diagram 4 of a loop processing mode and a stack structure processing mode according to an embodiment of the disclosure.
Figure 6:
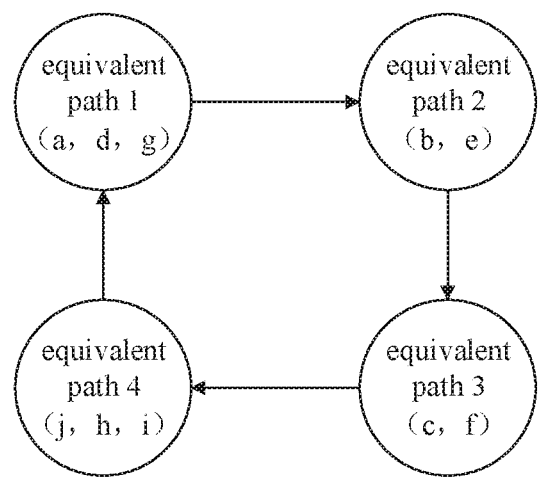
FIG. 6 is a schematic diagram 5 of a loop processing mode and a stack structure processing mode according to the disclosure.

When the equivalent path 2 in the multiple equivalent paths is failed, the node corresponding to the failed path is deleted from the loop, and then the traffic on the failed path is allocated to the normal path, as shown in FIG. 3. As shown in FIG. 4, finally the number of pieces of traffic allocated to all the equivalent paths, namely the equivalent paths 1 and 3 are the same, namely 5. After the failed path 2 has returned to normal, the node corresponding to the path 2 which has returned to normal is added in the loop, and then the traffic allocated from the failed path is allocated to the path which has returned to normal. Because the equivalent path 1 knows, via the record, that it has obtained the traffic b from the equivalent path 2 previously, the equivalent path 1 returns the traffic b to the equivalent path 2 which has returned to normal. Because the equivalent path 3 knows, through the record, that it has obtained the traffic e and the traffic h from the equivalent path 2 previously, the equivalent path 3 returns the traffic e and the traffic h to the equivalent path 2 which has returned to normal. The final returned traffic is shown in FIG. 2. When the equivalent path 4 is added, the node corresponding to the added equivalent path 4 s added into the loop, and then the original equivalent path allocates the last allocated traffic to the added equivalent path according to the traffic allocated to it and the allocation order of the traffic which are recorded, until the number of pieces of traffic allocated to the added equivalent path and the number of pieces of traffic allocated to the original equivalent path are the same or differ by one piece, as shown in FIG. 5. Generally, if the equivalent path about to allocate the traffic finds, when preparing to allocate the traffic to the equivalent path about to receive the traffic, that if it allocates one piece of traffic to the equivalent path about to receive the traffic, the number of pieces of traffic allocated to the equivalent path about to receive the traffic will exceed the number of pieces of traffic allocated to the equivalent path about to allocate the traffic, then it stops allocating the piece of traffic. In FIG. 5, if the equivalent path 3 finds, when preparing to allocate its one piece of traffic to the added equivalent path 4, that if it allocates the traffic i to the added equivalent path 4, the added equivalent path 4 will have 3 pieces of traffic, and the equivalent path 3 will have 2 pieces of traffic rest, then it will no longer allocate the traffic i to the added equivalent path 4. Certainly, because as long as the number of pieces of traffic allocated to the added equivalent path and the number of pieces of traffic allocated to the original equivalent path are the same or differ by one piece, the equivalent path can also allocate the traffic i to the added equivalent path 4, as shown in FIG. 6. In the whole traffic reallocation process, it can be determined through consultation that the number of pieces of traffic allocated to which equivalent path is greater than or less than the number of pieces of traffic allocated to other equivalent path by one piece, as long as finally the number of pieces of traffic allocated to each of the equivalent paths in the loop is the same as each other or differs from each other by one piece.

When the traffic is allocated by using the mode of completing allocation once, the loop processing mode can also be adopted. The actual implementation is similar to circularly allocating in order to perform traffic allocation, which will not be repeated herein.

The loop processing mode is not adopted when traffic allocation is performed by using the mode of completing allocation once, or the loop processing mode is not adopted when traffic allocation is performed by using the mode of circularly allocating in order, or the loop processing mode is adopted when traffic allocation is performed by using the mode of completing allocation once, or the loop processing mode is adopted when traffic allocation is performed by using the mode of circularly allocating in order. When it is required to perform traffic switching, the stack structure can be adopted to record the traffic allocated to each of the equivalent paths and the allocation order of the traffic.

When traffic allocation is performed by using the mode of circularly allocating in order, the loop processing mode is adopted. In this case, the processing of adopting the stack structure to record the traffic allocated to each of the equivalent paths and the allocation order of the traffic is shown in FIG. 2 to FIG. 6. As shown in FIG. 2, the traffic is arranged as the sequence of a, d, g, j according to the order of being allocated to the equivalent path 1, wherein the first allocated traffic a is at the stack bottom, and the last allocated traffic a is at the stack top. When any path 2 of the multiple equivalent paths is failed, as shown in FIG. 2, FIG. 3 and FIG. 4, the equivalent path 2 first allocates the traffic h at its stack top to the equivalent path 3, and then the traffic e becomes the stack top of the equivalent path 2. The equivalent path 2 first allocates the traffic e to the equivalent path again, and then the traffic b becomes the stack top of the equivalent path 2. In order to make the number of pieces of traffic allocated to all the equivalent paths finally the same, namely each including 5 pieces of traffic, the equivalent path 2 allocates the traffic b to the equivalent path 3.

As shown in FIG. 2, after the failed path has returned to normal, the normal paths 1 and 3 allocated with the traffic of the failed path allocate the traffic of their own stack tops to the failed path 2 which has returned to normal each time. That is, after returning the traffic e of its stack top to the failed path 2 which has returned to normal, the normal path 1 has returned all the traffic allocated from the path 2 previously to the failed path 2 which has returned to normal. After the normal path 3 returns the traffic b of its stack top to the failed path 2 which has returned to normal, the traffic h becomes the stack top, and is the traffic allocated from the path 2 previously. Therefore, in order to allocate the traffic allocated from the failed path 2 previously to the failed path 2 which has returned to normal, it is required to return the traffic h of the stack top to the failed path 2 which has returned to normal. At this point, the normal path 3 has returned the traffic b and the traffic h allocated from the failed path 2 previously to the failed path 2 which has returned to normal, and traffic allocation is stopped.

As shown in FIG. 5 and FIG. 6, when the equivalent path 4 is added, the original equivalent path 1 allocates the traffic j of its stack top to the added equivalent path 4, the original equivalent path 2 allocates the traffic h of its stack top to the added equivalent path 4, and the original equivalent path 3 allocates the traffic i of its stack top to the added equivalent path 4. The number of pieces of traffic allocated to the added equivalent path 4 and the number of pieces of traffic allocated to the original equivalent paths 1, 2 and 3 are the same or differ by one piece, and traffic allocation is stopped.

The loop processing mode is not adopted when traffic allocation is performed by using the mode of completing allocation once. The loop processing mode is not adopted when traffic allocation is performed by using the mode of circularly allocating in order. The loop processing mode is adopted when traffic allocation is performed by using the mode of completing allocation once. The loop processing mode is adopted when the processing of adopting the stack structure to record the traffic allocated to each of the equivalent paths and the allocation order of the traffic is performed and when traffic allocation is performed by using the mode of circularly allocating in order, which is similar to the processing of adopting the stack structure to record the traffic allocated to each of the equivalent paths and the allocation order of the traffic, so it will not be repeated here.

APPLICATION EXAMPLE TWO

When the equivalent paths are fixed or predictable as 1, 2, 3, and 4, the LCM 12 of the four numbers 1, 2, 3 and 4 is taken as the number of pieces of traffic to be divided.

The values corresponding to the source IP addresses of all the messages to be forwarded include 12 to 47, wherein the value 0 gotten by remaindering the values 12, 24 and 36 corresponding to the source IP addresses and the determined number of pieces of traffic is classified into one piece, the value 1 gotten by remaindering the values 13, 25 and 37 corresponding to the source IP addresses and the determined number of pieces of traffic is classified into one piece, and so on, until the value 11 gotten by remaindering the values 23, 35 and 47 corresponding to the source IP addresses and the determined number of pieces of traffic is classified into one piece.

When the traffic is allocated by using the mode of circularly allocating in order, the traffic with the remainder 0 is allocated to the first equivalent path, the traffic with the remainder 1 is allocated to the second equivalent path, the traffic with the remainder 2 is allocated to the third equivalent path, and the traffic with the remainder 3 is allocated to the fourth equivalent path. At this point, all the equivalent paths are allocated with one piece of traffic. The same allocation process is repeated, and the traffic with the remainder 4 is allocated to the first equivalent path, and so on, until all the fourth equivalent paths include 12/4=3 pieces of traffic, as shown in Table 1 above.

When the method of allocating the number of pieces of traffic, which should be carried by the equivalent path, to each of the equivalent paths once is adopted, three pieces of traffic with the remainders 0, 1 and 2 are allocated to the first equivalent path once, three pieces of traffic with the remainders 3, 4 and 5 are allocated to the second equivalent path once, three pieces of traffic with the remainders 6, 7 and 8 are allocated to the third equivalent path once, and three pieces of traffic with the remainders 9, 10 and 11 are allocated to the fourth equivalent path once, as shown in Table 2 above.

Figure 7:
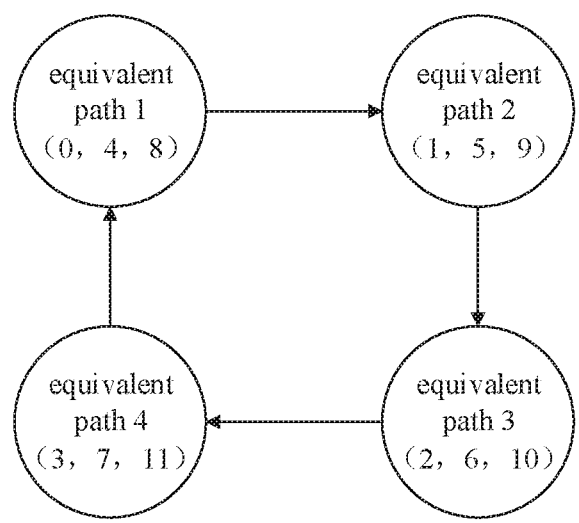
FIG. 7 is a schematic diagram 6 of a loop processing mode and a stack structure processing mode according to the disclosure.

In the traffic allocation process, each of the equivalent paths can record the traffic allocated to it and the allocation order of the traffic by using the loop processing mode. When the traffic is allocated by using the mode of circularly allocating in order, as shown in FIG. 7, the equivalent paths 1, 2, 3 and 4 are strung into a loop, wherein each node in the loop represents an equivalent path, and the traffic allocated to each of the equivalent paths and the allocation order of the traffic are recorded into the corresponding node.

Figure 8:
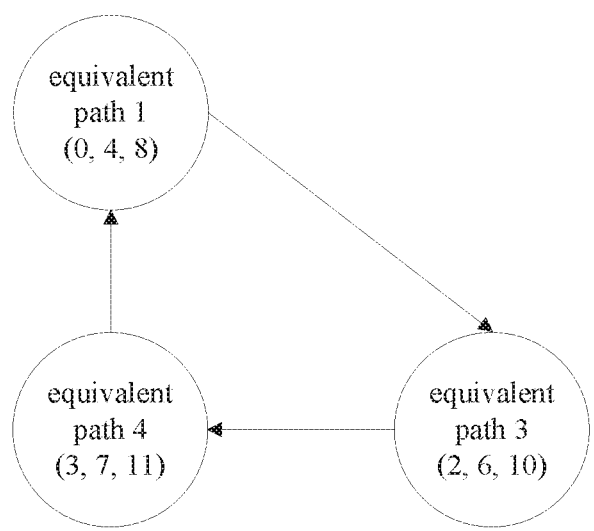
FIG. 8 is a schematic diagram 7 of a loop processing mode and a stack structure processing mode according to the disclosure.
Figure 9:
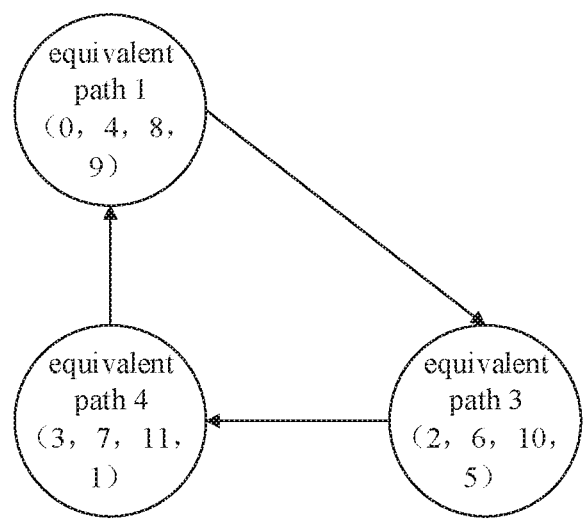
FIG. 9 is a schematic diagram 8 of a loop processing mode and a stack structure processing mode according to the disclosure.

When the equivalent path 2 in the multiple equivalent paths is failed, the node corresponding to the failed path 2 is deleted from the loop, and then the traffic on the failed path is allocated to the normal path, as shown in FIG. 8. As shown in FIG. 9, finally the number of pieces of traffic allocated to each of the equivalent paths is the same, namely each of the equivalent paths 1, 3 and 4 has 4 pieces of traffic. After the failed path 2 has returned to normal, the node corresponding to the path 2 which has returned to normal is added in the loop, and then the traffic allocated from the failed path is allocated to the path which has returned to normal. Because the equivalent path 1 knows, through the record, that it has obtained the traffic with the remainder 9 from the equivalent path 2 previously, the equivalent path 1 returns the traffic with the remainder 9 to the equivalent path 2 which has returned to normal. Because the equivalent path 3 knows, through the record, that it has obtained the traffic with the remainder 5 from the equivalent path 2 previously, the equivalent path 3 returns the traffic with the remainder 5 to the equivalent path 2 which has returned to normal. The final returned traffic is shown in FIG. 7.

Figure 10:
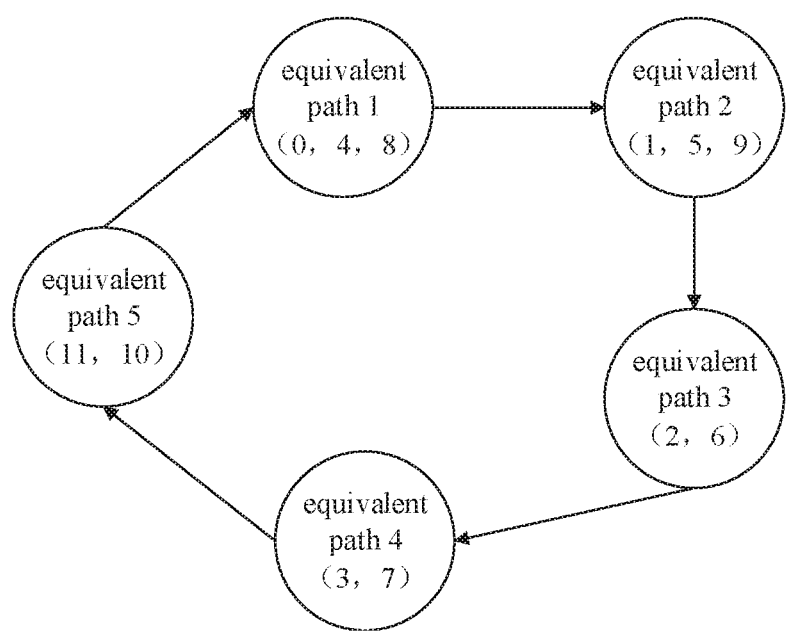
FIG. 10 is a schematic diagram 9 of a loop processing mode and a stack structure processing mode according to the disclosure.

When the equivalent path 4 is added, the node corresponding to the added equivalent path 4 is added into the loop, and then the original equivalent path allocates the last allocated traffic to the added equivalent path according to the traffic allocated to it and the allocation order of the traffic which are recorded, until the number of pieces of traffic allocated to the added equivalent path is the same as or differs from the number of pieces of traffic allocated to the original equivalent path by one piece, as shown in FIG. 10. Generally, if the equivalent path about to allocate the traffic finds, when preparing to allocate the traffic to the equivalent path about to receive the traffic, that if it allocates one piece of traffic to the equivalent path about to receive the traffic, the number of pieces of traffic allocated to the equivalent path about to receive the traffic will exceed the number of pieces of traffic allocated to the equivalent path about to allocate the traffic, then it stops allocating the piece of traffic. In FIG. 10, one piece of traffic with remainder 11 is allocated from the stack top of the equivalent path 4 to the added equivalent path 5, and then one piece of traffic with remainder 10 is allocated from the stack top of the equivalent path 3 to the added equivalent path 5. If the equivalent path 2 finds, when preparing to allocate the traffic to the equivalent path 5, that the number of pieces of traffic allocated to the added equivalent path 5 is less than it by 1, then it stops traffic allocation. The situation of the equivalent path 1 is similar to the above, as shown in Table 5 below. Certainly, because as long as the number of pieces of traffic allocated to the added equivalent path and the number of pieces of traffic allocated to the original equivalent path are the same or differ by one piece, the equivalent path 2 can also allocate the traffic 9 of the stack top to the added equivalent path 5. In the whole traffic reallocation process, it can be determined through consultation that the number of pieces of traffic allocated to which equivalent path is greater than or less than the number of pieces of traffic allocated to other equivalent path by one piece, as long as finally the number of pieces of traffic allocated to each of the equivalent paths in the loop is the same or differs by one piece.

TABLE 5

State after an equivalent path is added

| Path | The number of pieces of traffic allocated to each of the paths | Traffic allocated to each of the paths (represented by remainders) |
| --- | --- | --- |
| Equivalent path 1 | 3 | 0, 4, 8 |
| Equivalent path 2 | 3 | 1, 5, 9 |
| Equivalent path 3 | 2 | 2, 6 |
| Equivalent path 4 | 2 | 3, 7 |
| Equivalent path 5 | 2 | 11, 10 |

When the traffic is allocated by using the mode or completing allocation once, the loop processing mode can also be adopted. The actual implementation is similar to using the mode of circularly allocating in order to perform traffic allocation, so it will not be repeated herein.

The loop processing mode is not adopted when traffic allocation is performed by using the mode of completing allocation once, or the loop processing mode is not adopted when traffic allocation is performed by using the mode of circularly allocating in order, or the loop processing mode is adopted when traffic allocation is performed by using the mode of completing allocation once, or the loop processing mode is adopted when traffic allocation is performed by using the mode of circularly allocating in order. When it is required to perform traffic switching, the stack structure can be adopted to record the traffic allocated to each of the equivalent paths and the allocation order of the traffic.

When traffic allocation is performed by using the mode of circularly allocating in order, the loop processing mode is adopted. In this case, the processing of adopting the stack structure to record the traffic allocated to each of the equivalent paths and the allocation order of the traffic is shown in FIG. 7 to FIG. 11. As shown in FIG. 2, the traffic is arranged as a sequence of 0, 4, 8, according to the order of being allocated to the equivalent path 1, wherein the first allocated traffic 0 is at the stack bottom, and the last allocated traffic 8 is at the stack top. When any path 2 of the multiple equivalent paths is failed, as shown in FIG. 2, FIG. 3 and FIG. 4, the equivalent path 2 first allocates the traffic with the remainder 9 of its stack top to the equivalent path 1, then the traffic with the remainder 5 becomes the stack top of the equivalent path 2. The equivalent path 2 reallocates the traffic with the remainder 5 to the equivalent path 3, then the traffic with the remainder 1 becomes the stack top of the equivalent path 2. In order to make the number of pieces of traffic allocated to all the equivalent paths finally the same, namely each including 4 pieces of traffic, the equivalent path 2 allocates the traffic with the remainder 1 to the equivalent path 4.

As shown in FIG. 2, after the failed path has returned to normal, the normal paths 1, 3 and 4 allocated with the traffic of the failed path allocate the traffic of their own stack tops to the failed path 2 which has returned to normal each time. That is, after returning the traffic with the remainder 9 of its stack top to the failed path 2 which has returned to normal, the normal path 1 has returned all the traffic allocated from the path 2 previously to the failed path 2 which has returned to normal. After returning the traffic with the remainder 5 of its stack top to the failed path 2 which has returned to normal, the normal path 3 has returned all the traffic allocated from the path 2 previously to the failed path 2 which has returned to normal, and stops traffic allocation. After returning the traffic with the remainder 1 of its stack top to the failed path 2 which has returned to normal, the normal path 4 has returned all the traffic allocated from the path 2 previously to the failed path 2 which has returned to normal, and stops traffic allocation.

As shown in FIG. 5 and FIG. 6, when the equivalent path 5 is added, the original equivalent path 4 allocates the traffic with the remainder 11 of its stack top to the added equivalent path 5, the original equivalent path 3 allocates the traffic with the remainder 10 of its stack top to the added equivalent path 5, then the number of pieces of traffic allocated to the added equivalent path 5 and the number of pieces of traffic allocated to the original equivalent paths 1, 2, 3 and 4 are the same or differ by one piece, and traffic allocation is stopped.

The loop processing mode is not adopted when traffic allocation is performed by using the mode of completing allocation once, or the loop processing mode is not adopted when traffic allocation is performed by using the mode of circularly allocating in order, or the loop processing mode is adopted when traffic allocation is performed by using the mode of completing allocation once, the loop processing mode is adopted when the processing of adopting the stack structure to record the traffic allocated to each of the equivalent paths and the allocation order of pieces of traffic is performed and when traffic allocation is performed by using the mode of circularly allocating in order, which is similar to the processing of adopting the stack structure to record the traffic allocated to each of the equivalent paths and the allocation order of the traffic, so it will not be repeated herein.

Figure 11:
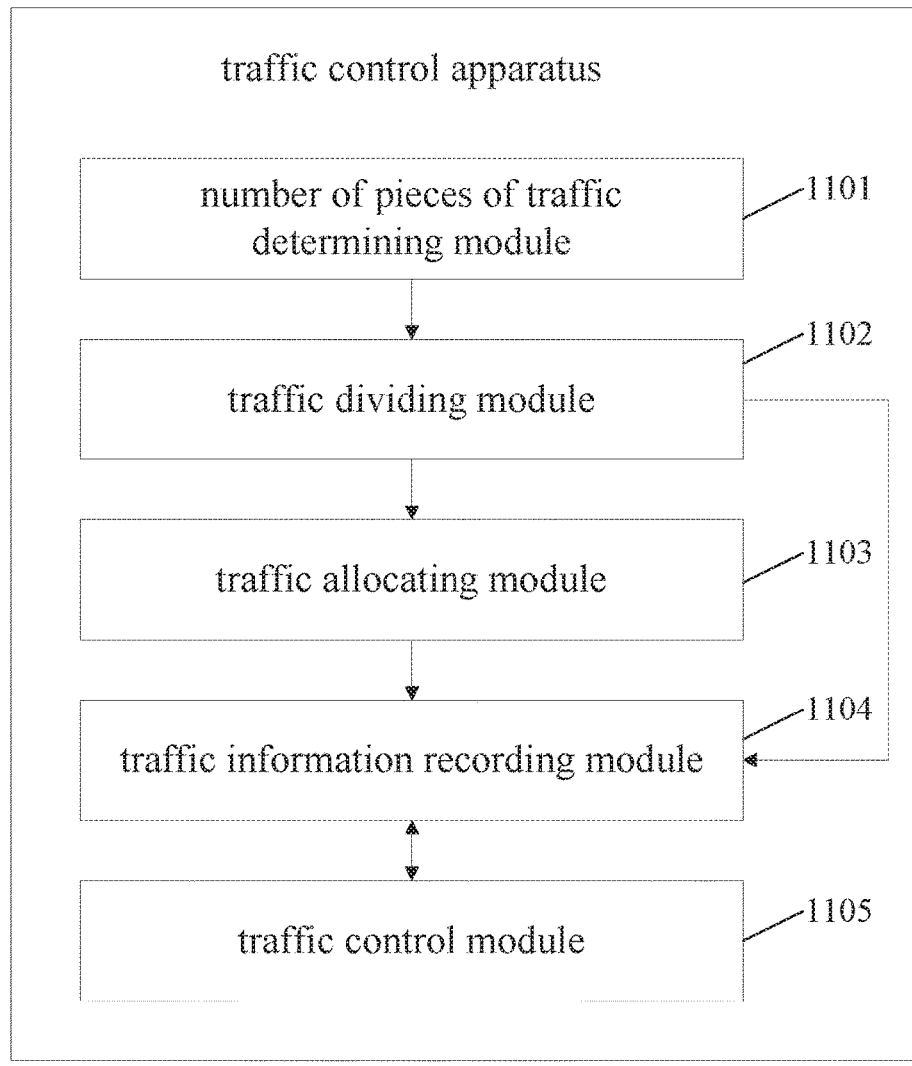
FIG. 11 is a structure diagram illustrating a traffic control apparatus according to the disclosure.

The embodiment of the disclosure also discloses a traffic control apparatus. As shown in FIG. 11, the apparatus includes a number of pieces of traffic determining module 1101, a traffic dividing module 1102, a traffic allocating module 1103, a traffic information recording module 1104 and a traffic control module 1105.

The number of pieces of traffic determining module 1101 is configured to determine the number n of pieces of traffic to be divided, wherein n is greater than or equal to 2.

The traffic dividing module 1102 is configured to divide all available traffic into n pieces, wherein each piece of the traffic is the same or differs by one unit.

The traffic allocating module 1103 is configured to allocate n pieces of traffic to m equivalent paths, so that each of the equivalent paths is allocated with n/m or n/m+1 pieces of traffic.

The traffic information recording module 1104 is configured to, in the traffic allocation process, record the traffic allocated to each of the equivalent paths and the allocation order of the traffic.

The traffic control module 1105 is configured to, when it is required to perform traffic switching, perform, according to the traffic allocated to each of the equivalent paths and the allocation order of the traffic which are recorded by the traffic information recording module 1104, allocation in a manner of first allocating the last allocated traffic to the equivalent path in need, so that the number of pieces of traffic allocated to each of the equivalent paths is the same or differs by one piece.

In an exemplary embodiment, the traffic control module 1105 is configured to, when it is required to perform traffic switching, perform, according to the traffic allocated to each of the equivalent paths and the allocation order of the traffic which are recorded, allocation in a manner of first allocating the last allocated traffic to the equivalent path in need, so that the number of pieces of traffic allocated to each of the equivalent paths is the same or differs by one piece, in the following manner.

When any path of multiple equivalent paths is failed, the traffic on the failed path is allocated to the normal path, wherein the number of pieces of traffic allocated to each of the normal paths is the same or differs by one piece of traffic.

The original traffic of the normal path is maintained unchanged, and at the same time, the traffic information recording module 1104 is notified to record the traffic allocated from the failed path to each of the normal paths and the allocation order of the allocated traffic.

The traffic control module 1105 is further configured to, when it is required to perform traffic switching, perform, according to the traffic allocated to each of the equivalent paths and the allocation order of the traffic which are recorded by the traffic information recording module 1104, allocation in a manner of first allocating the last allocated traffic to the equivalent path in need, so that the number of pieces of traffic allocated to each of the equivalent paths is the same or differs by one piece, in the following manner.

After the failed path has returned to normal, the traffic allocated from the failed path is allocated to the failed path which has returned to the normal according to the traffic allocated from the failed path to the normal path and the allocation order of the allocated traffic which are recorded by the traffic information recording module 1104.

The traffic control module 1105 is further configured to, when it is required to perform traffic switching, perform, according to the traffic allocated to each of the equivalent paths and the allocation order of the traffic which are recorded, allocation in a manner of first allocating the last allocated traffic to the equivalent path in need, so that the numbers of pieces of traffic allocated to all the equivalent paths are the same or differ by one piece, as follows.

When an equivalent path is added, each of the original equivalent paths allocates the last allocated traffic to the added equivalent path according to the traffic allocated to it and the allocation order of the traffic which are recorded by the traffic information recording module 1104, wherein the number of pieces of traffic allocated to the added equivalent path by each of the original equivalent paths is the same or differs by one piece of traffic, until the number of pieces of traffic allocated to the added equivalent path is the same as or differs from the number of pieces of traffic allocated to the original equivalent path by one piece.

In an exemplary embodiment, the number of pieces of traffic determining module 1101 is configured to determine the number n of pieces of traffic to be divided as follows. The number n of pieces of traffic to be divided is determined according to an experiment value, and the number of pieces of traffic enables the traffic to be allocated to multiple equivalent paths as evenly as possible. The embodiment is applied to a situation where the number m of equivalent paths is not determined or difficult to be determined.

In an exemplary embodiment, the number of pieces of traffic determining module 1101 can also be configured to determine the number n of pieces of traffic to be divided as follows. The LCM of all possible values in the variation range of the number of equivalent paths is taken as the number n of pieces of traffic to be divided.

If the variation range of the number of equivalent paths is (n, n+1 . . . n+m), the LCM of all possible values from n to n+m is taken as the number of pieces of traffic to be divided, so that absolutely even allocation of the traffic can be ensured. For example, if the variation range of the number of equivalent paths is (1, 2, 3, 4), the LCM 12 of the four possible values 1, 2, 3 and 4 is taken as the number of pieces of traffic to be divided. The manner of taking the LCM of all possible values in the variation range of the number of equivalent paths as the number n of pieces of traffic to be divided is applied to a situation where the number of equivalent paths is fixed or predictable. For example, for the networks of most companies, the number of equivalent paths is determined, or is at least in a certain range.

In an exemplary embodiment, the traffic dividing module 1102 is configured to divide all available traffic into n pieces, wherein each piece of the traffic is the same or differs by one unit, as follows. All available traffic is divided into n pieces according to the preset rule, wherein the preset rule is any rule that can make each piece of the traffic the same or differ by one unit.

In an exemplary embodiment, the preset rule is the values corresponding to addresses of all messages to be forwarded.

In an exemplary embodiment, the traffic dividing module 1102 is configured to divide all available traffic into n pieces according to the preset rule, as follows. The values corresponding to the addresses of all the messages to be forwarded and the determined number of pieces of traffic are remaindered, and all the traffic with the same remainder is classified into one piece.

In an exemplary embodiment, the addresses can be the source IP address, or the destination IP address, or the source MAC address, or the destination MAC address.

In an exemplary embodiment, the preset rule can also be the protocol types.

In an exemplary embodiment, the traffic dividing module 1102 is configured to divide all available traffic into n pieces according to the preset rule, as follows. The traffic is divided into n pieces aiming at each of the protocol types.

For example, when the values corresponding to the addresses of all the messages to be forwarded and the determined number of pieces of traffic are remaindered and all the traffic with the same remainder is classified into one piece, the values corresponding to the source IP addresses of all the messages to be forwarded include 12 to 47, wherein the value 0 gotten by remaindering the values 12, 24 and 36 corresponding to the source IP addresses and the determined number of pieces of traffic is classified into one piece, the value 1 gotten by remaindering the values 13, 25 and 37 corresponding to the source IP addresses and the determined number of pieces of traffic is classified into one piece, and so on, until the value 11 gotten by remaindering the values 23, 35 and 47 corresponding to the source IP addresses and the determined number of pieces of traffic is classified into one piece.

The traffic allocating module 1103 is configured to allocate the multiple pieces of traffic to m equivalent paths, so that each of the equivalent paths is allocated with n/m or n/m+1 pieces of traffic, as follows.

One piece of traffic is allocated to one of the equivalent paths each time by using the mode of circularly allocating in order. When all the equivalent paths are allocated with the same number of pieces of traffic, the same allocating process is repeated until each of the equivalent paths is allocated with n/m or n/m+1 pieces of traffic. For example, if all available traffic is divided into 12 pieces, when the traffic is allocated by using the mode of circularly allocating in order, the traffic with the remainder 0 is allocated to the first equivalent path, the traffic with the remainder 1 is allocated to the second equivalent path, the traffic with the remainder 2 is allocated to the third equivalent path, and the traffic with the remainder 3 is allocated to the fourth equivalent path. At this point, all the equivalent paths are allocated with one piece of traffic. The same allocation process is repeated, and the traffic with the remainder 4 is allocated to the first equivalent path, and so on, until all the fourth equivalent paths include 12/4=3 pieces of traffic, as shown in Table 1 above.

Alternatively, n/m or n/m+1 pieces of traffic, which should be carried by each of the equivalent paths, are allocated to the corresponding equivalent path once by using a method of allocating the number of pieces of traffic, which should be carried by the equivalent path, to each of the equivalent paths once. For example, three pieces of traffic with the remainders 0, 1 and 2 are allocated to the first equivalent path once, three pieces of traffic with the remainders 3, 4 and 5 are allocated to the second equivalent path once, three pieces of traffic with the remainders 6, 7 and 8 are allocated to the third equivalent path once, and three pieces of traffic with the remainders 9, 10 and 11 are allocated to the fourth equivalent path once, as shown in Table 2 above.

The traffic recording module 1104 is configured to, in the traffic allocation process, record the traffic allocated to each of the equivalent paths and the allocation order of the traffic, as follows.

All the m equivalent paths are strung into a loop, wherein each node in the loop represents an equivalent path, and the traffic allocated to each of the equivalent paths and the allocation order of the traffic are recorded into the corresponding node.

Correspondingly, the traffic control module 1105 is further configured to, when any path of the multiple equivalent paths is failed, delete the node corresponding to the failed path from the loop.

The traffic control module 1105 is further configured to, after the failed path is recovered, add the node corresponding to the path which has recovered in the loop.

The traffic control module 1105 is further configured to, when an equivalent path is added, add the node corresponding to the added equivalent path in the loop.

The traffic information recording module 1104 is configured to, in the traffic allocation process, record the traffic allocated to each of the equivalent paths and the allocation order of the traffic, as follows. The stack structure is adopted to record the traffic allocated to each of the equivalent paths and the allocation order of the traffic. That is, the traffic is arranged according to an order of being allocated to the equivalent paths, wherein the first allocated traffic is at the stack bottom, and the last allocated traffic is at the stack top.

The traffic control module 1105 is configured to, when any path of the multiple equivalent paths is failed, allocate the traffic on the failed path to the normal path, as follows.

When any path of the multiple equivalent paths is failed, the traffic of the stack top on the failed path is allocated to the normal paths, until the number of pieces of traffic allocated to each of the normal paths is the same or differs by one piece.

The traffic control module 1105 is configured to, after the failed path has returned to normal, allocate the traffic allocated from the failed path to the normal path according to the traffic allocated from the failed path to the normal path and the allocation order of the allocated traffic which are recorded by the traffic information recording module 1104, as follows.

After the failed path has returned to normal, the traffic of the stack top of each of the normal paths is allocated to the failed path which has returned to normal according to the traffic allocated from the failed path to each of the normal paths and the allocation order of the allocated traffic which are recorded by the traffic information recording module 1104, until all the traffic allocated from the failed path is allocated to the normal paths, and all the traffic allocated from the failed path is allocated to the path which has returned to normal.

The traffic control module 1105 is configured to, when an equivalent path is added, enable each of the original equivalent path(s) to allocate the last allocated traffic to the added equivalent path according to the traffic allocated to the original equivalent paths and the allocation order of the traffic which are recorded by the traffic information recording module 1104, as follows.

When an equivalent path is added, each of the original equivalent paths allocates the traffic of its stack top to the added equivalent path each time according to the traffic allocated to the original equivalent paths and the allocation order of the traffic which are recorded by the traffic information recording module 1104, until the number of pieces of traffic allocated to the added equivalent path and the number of pieces of traffic allocated to the original equivalent paths are the same or differ by one piece.

Any of the above traffic allocation apparatuses can be in the EMCP system or other similar systems.

Figure 12:
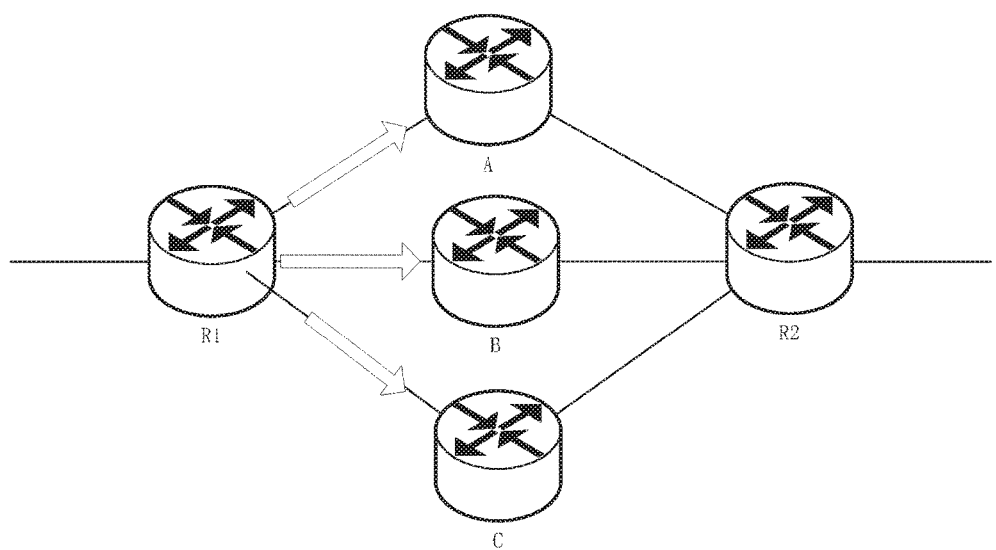
FIG. 12 is a schematic diagram 1 of a traffic control mode of the related art.

In the related ECMP technology, after a certain path is failed, it is required to hash again, so that the traffic is evenly allocated on the remaining paths. As an example shown in FIG. 12, it is assumed that a link C is failed and thus the path 3 will be removed from the equivalent paths. After hashing gain, a part of the original traffic going through the path 1 will go through the path 2, and a part of the traffic going through the path 1 will go through the path 1. Apparently, when a certain path of the multiple equivalent paths is failed, the related processing method will thoroughly disrupt the traffic of all paths, and then reallocate it. Accordingly, the efficiency of traffic allocation is influenced, and a subsequent traffic recovery process is influenced. By the technical solutions of the disclosure, after the path 3 is removed from the link, the paths of the traffic selecting the path 1 and the path 2 in the beginning remain unchanged, and only the traffic going through the path 3 is divided into two pieces going through the path 1 and the path 2 respectively. After the failed path has returned to normal, it can be ensured that the traffic of the original path 3 still goes through the path 3. In the process, the impact on the traffic of other paths is minimized.

Figure 13:
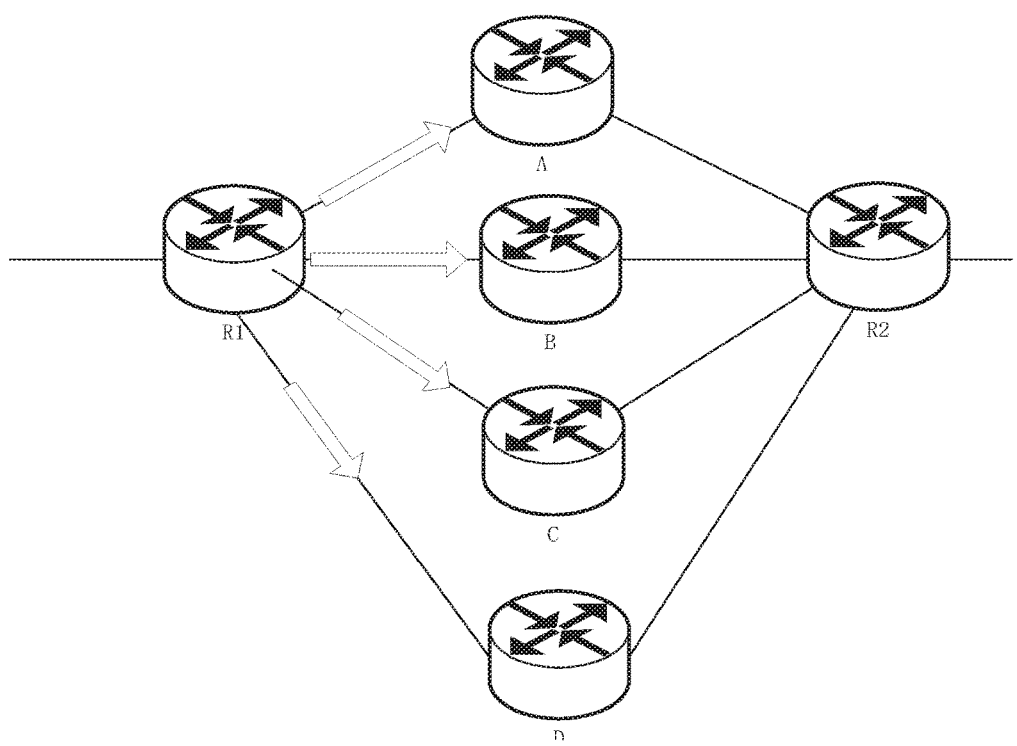
FIG. 13 is a schematic diagram 2 of a traffic control mode of the related art.

In the related ECMP technology, when the number of equivalent paths increases, a path 4, for example, is added (R1, D, R2), as shown in FIG. 13. Hashing again will cause the path corresponding to other traffic not carried by the path 4 to change except causing the path of the traffic which should be carried by the path 4 to change. Apparently, when an equivalent path is added, the related processing method will also thoroughly disrupt the traffic of all paths, and then reallocate it. Accordingly, the efficiency of traffic allocation is influenced, and a subsequent traffic recovery process is influenced. By the technical solutions of the disclosure, only the traffic which should be carried by the path 4 is transferred from the original path(s) to the path 4, and the other traffic of the original path(s) not carried by the path 4 s maintained.

Apparently, the traffic control methods of the embodiments of the disclosure minimize an impact on the original path(s) when traffic switching happens, thereby improving the efficiency of traffic reallocation.

The embodiments of the disclosure also provide a computer readable storage medium having computer executable instructions stored therein. The computer executable instructions perform the traffic control methods when being executed by a processor.

The above is only the optional embodiments of the disclosure and not intended to limit the disclosure. Any modifications, equivalent replacements and improvements within the spirit and principle of the disclosure shall fall within the scope of the claims of the disclosure.

Those skilled in the art can understand that all or part of the steps in the methods can be completed by means of hardware instructed by a program. The program can be stored in a computer readable storage media, such as a Read-Only Memory (ROM), a magnetic disk, or a compact disk. In an exemplary embodiment, all or part of the steps in the embodiments can also be implemented by using one or more integrated circuits. Correspondingly, each module/unit in the embodiments can be realized in form of either hardware or software function module. The disclosure is not limited to any particular combination of hardware and software.

Certainly, the disclosure may have many other embodiments. On the premise of not departing from the spirit and essence of the disclosure, those skilled in the art may also make various corresponding modifications and changes according to the disclosure, but these corresponding modifications and changes shall fall within the scope of the claims of the disclosure.

INDUSTRIAL APPLICABILITY

By the embodiments of the disclosure, an impact on the original paths can be minimized during traffic switching, thereby improving the efficiency of traffic reallocation.

The invention claimed is:

1. A traffic control method, comprising:
determining the number n of pieces of traffic to be divided, wherein n is greater than or equal to 2;
dividing all available traffic into n pieces, wherein each piece of traffic is the same as each other or differs from each other by one unit;
allocating n pieces of traffic to m equivalent paths so that each of the equivalent paths is allocated with n/m or n/m+1 pieces of traffic;
recording, by each of the equivalent paths, traffic allocated to itself and an allocation order of the traffic in a traffic allocation process;
when it is required to perform traffic switching, performing, according to the allocated traffic and the allocation order thereof which are recorded by each of the equivalent paths, allocation in a manner of first allocating last allocated traffic to an equivalent path in need, so that the number of pieces of traffic allocated to each of the equivalent paths is the same as each other or differs from each other by one piece;
wherein the step of performing comprises:
when any path of multiple equivalent paths is failed, allocating the traffic on the failed path to normal paths, wherein the number of pieces of traffic allocated to each of the normal paths is the same as each other or differs from each other by one piece of traffic;
maintaining original traffic of each of the normal paths unchanged, and recording, by each of the normal paths, the traffic allocated from the failed path to itself and the allocation order of the allocated traffic.

2. The traffic control method according to claim 1, further comprising:
after the failed path is recovered, allocating, by the normal paths allocated with the traffic of the failed path, the traffic allocated from the failed path to the failed path which has recovered, according to the recorded traffic allocated from the failed path to itself and the recorded allocation order of the allocated traffic.

3. The traffic control method according to claim 2, wherein the step of recording, by each of the equivalent paths, the traffic allocated to itself and the allocation order of the traffic comprises:
stringing all the m equivalent paths into a loop, wherein each node in the loop represents one equivalent path, and recording the traffic allocated to each of the equivalent paths and the allocation order of the traffic into a corresponding node;
correspondingly, when any path of the multiple equivalent paths is failed, deleting the node corresponding to the failed path from the loop, and then performing the step of allocating the traffic on the failed path to the normal paths;
after the failed path is recovered, adding the node corresponding to the recovered path into the loop, and then performing the step of allocating the traffic allocated from the failed path to the path which has recovered;
when an equivalent path is added, adding the node corresponding to the added equivalent path into the loop, and then performing the step of allocating, by each of the original equivalent paths, the last allocated traffic to the added equivalent path according to the recorded traffic allocated to itself and the recorded allocation order of the traffic.

4. The traffic control method according to claim 2, wherein the step of recording, by each of the equivalent paths, the traffic allocated to itself and the allocation order of the traffic and the step of recording, by each of the normal paths, the traffic allocated from the failed part to itself and the allocation order of the traffic comprise:
adopting a stack structure to record the traffic allocated to each of the equivalent paths and the allocation order of the traffic, comprising: arranging the traffic according to a sequence of being allocated to each of the equivalent paths or each of the normal paths, wherein the first allocated traffic is at a stack bottom, and the last allocated traffic is at a stack top;
when any path of the multiple equivalent paths is failed, allocating the traffic of the stack top on the failed path to the normal paths, until the number of pieces of traffic allocated to each of the normal paths is the same as each other or differs from each other by one piece;
after the failed path is recovered, allocating, by each of the normal paths allocated with the traffic of the failed path, the traffic of its own stack top to the failed path which has recovered, and allocating the traffic allocated from the failed path to the failed path which has recovered, until all the traffic allocated from the failed path is allocated to the path which has recovered;
when an equivalent path is added, allocating, by each of the original equivalent paths, the traffic of its stack top to the added equivalent path, until the number of pieces of traffic allocated to the added equivalent path is the same as the number of pieces of traffic allocated to each of the original equivalent paths or differs from the number of pieces of traffic allocated to each of the original equivalent paths by one piece.

5. The traffic control method according to claim 1, wherein the step of performing comprises:
when an equivalent path is added, allocating, by each of original equivalent paths, the last allocated traffic to the added equivalent path according to the recorded traffic allocated to itself and the recorded allocation order of the traffic, wherein the number of pieces of traffic allocated to the added equivalent path by each of the original equivalent paths is the same as each other or differs from each other by one piece of traffic, until the number of pieces of traffic allocated to the added equivalent path is the same as the number of pieces of traffic allocated to each of the original equivalent paths or differs from the number of pieces of traffic allocated to each of the original equivalent paths by one piece.

6. The traffic control method according to claim 5, wherein the step of recording, by each of the equivalent paths, the traffic allocated to itself and the allocation order of the traffic comprises:
stringing all the m equivalent paths into a loop, wherein each node in the loop represents one equivalent path, and recording the traffic allocated to each of the equivalent paths and the allocation order of the traffic into a corresponding node;

correspondingly, when any path of the multiple equivalent paths is failed, deleting the node corresponding to the failed path from the loop, and then performing the step of allocating the traffic on the failed path to the normal paths;

after the failed path is recovered, adding the node corresponding to the recovered path into the loop, and then performing the step of allocating the traffic allocated from the failed path to the path which has recovered;

when an equivalent path is added, adding the node corresponding to the added equivalent path into the loop, and then performing the step of allocating, by each of the original equivalent paths, the last allocated traffic to the added equivalent path according to the recorded traffic allocated to itself and the recorded allocation order of the traffic.

7. The traffic control method according to claim 5, wherein the step of recording, by each of the equivalent paths, the traffic allocated to itself and the allocation order of the traffic and the step of recording, by each of the normal paths, the traffic allocated from the failed part to itself and the allocation order of the traffic comprise:

adopting a stack structure to record the traffic allocated to each of the equivalent paths and the allocation order of the traffic, comprising: arranging the traffic according to a sequence of being allocated to each of the equivalent paths or each of the normal paths, wherein the first allocated traffic is at a stack bottom, and the last allocated traffic is at a stack top;

when any path of the multiple equivalent paths is failed, allocating the traffic of the stack top on the failed path to the normal paths, until the number of pieces of traffic allocated to each of the normal paths is the same as each other or differs from each other by one piece;

after the failed path is recovered, allocating, by each of the normal paths allocated with the traffic of the failed path, the traffic of its own stack top to the failed path which has recovered, and allocating the traffic allocated from the failed path to the failed path which has recovered, until all the traffic allocated from the failed path is allocated to the path which has recovered;

when an equivalent path is added, allocating, by each of the original equivalent paths, the traffic of its stack top to the added equivalent path, until the number of pieces of traffic allocated to the added equivalent path is the same as the number of pieces of traffic allocated to each of the original equivalent paths or differs from the number of pieces of traffic allocated to each of the original equivalent paths by one piece.

8. The traffic control method according to claim 1, wherein the step of determining the number n of pieces of traffic to be divided comprises:

taking a Least Common Multiple (LCM) of all possible values in a variation range of the number of equivalent paths as the number n of pieces of traffic to be divided, wherein the variation range of the number of equivalent paths is a set of all possible values of the number of equivalent paths available for work.

9. The traffic control method according to claim 1, wherein the step of dividing all available traffic into n pieces comprises:

dividing all available traffic into n pieces according to a preset rule, wherein the preset rule is any rule capable of making each piece of the traffic the same as each other or differ from each other by one unit.

10. The traffic control method according to claim 9, wherein, the preset rule is values corresponding to addresses of all messages to be forwarded; and the step of dividing all available traffic into n pieces according to the preset rule comprises:

remaindering the values corresponding to the addresses of all the messages to be forwarded and the determined number of pieces of traffic, and classifying all the traffic with the same remainder into one piece.

11. The traffic control method according to claim 10, wherein the addresses are a source IP address, or a destination IP address, or a source Media Access Control (MAC) address, or a destination MAC address.

12. The traffic control method according to claim 9, wherein, the preset rule is protocol types; and the step of dividing all available traffic into n pieces according to the preset rule comprises: dividing the traffic for each of the protocol types into n pieces.

13. The traffic control method according to claim 1, wherein the step of allocating n pieces of traffic to m equivalent paths comprises:

allocating one piece of traffic to one of the equivalent paths each time in order; and when all the equivalent paths are allocated, repeating the same allocating process until each of the equivalent paths is allocated with n/m or n/m+1 pieces of traffic; or, allocating n/m or n/m+1 pieces of traffic, which should be carried by each of the equivalent paths, to a corresponding equivalent path once.

14. A traffic control apparatus, comprising: at least one processor configured to perform a number of pieces of traffic determining module, a traffic dividing module, a traffic allocating module, a traffic information recording module and a traffic control module, wherein the number of pieces of traffic determining module is configured to determine the number n of pieces of traffic to be divided, wherein n is greater than or equal to 2;

the traffic dividing module is configured to divide all available traffic into n pieces, wherein each piece of the traffic is the same as each other or differs from each other by one unit;

the traffic allocating module is configured to allocate n pieces of traffic to m equivalent paths so that each of the equivalent paths is allocated with n/m or n/m+1 pieces of traffic;

the traffic information recording module is configured to record the traffic allocated to each of the equivalent paths and an allocation order of the traffic in a traffic allocation process; and the traffic control module is configured to, when it is required to perform traffic switching, perform, according to the allocated traffic and the allocation order thereof which are recorded by the traffic information recording module, allocation in a manner of first allocating last allocated traffic to an equivalent path in need, so that the number of pieces of traffic allocated to each of the equivalent paths is the same as each other or differs from each other by one piece;

wherein the traffic control module is further configured to: when any path of multiple equivalent paths is failed, allocate the traffic on the failed path to normal paths, wherein the number of pieces of traffic allocated to each of the normal paths is the same as each other or differs from each other by one piece of traffic;

maintain original traffic of each of the normal paths unchanged, and notify the traffic information recording module to record the traffic allocated from the failed part to each of the normal paths and the allocation order of the allocated traffic.

15. The traffic control apparatus according to claim 14, wherein the traffic control module is further configured to:

after the failed path is recovered, allocate the traffic allocated from the failed path to the failed path which has recovered, according to the traffic allocated from the failed path to the normal paths and the allocation order of the allocated traffic which are recorded by the traffic information recording module;

when an equivalent path is added, allocate, by each of original equivalent paths, the last allocated traffic to the added equivalent path according to the traffic allocated to itself and the allocation order of the traffic which are recorded by the traffic information recording module, wherein the number of pieces of traffic allocated to the added equivalent path by each of the original equivalent paths are the same as each other or differs from each other by one piece of traffic, until the number of pieces of traffic allocated to the added equivalent path is the same as the number of pieces of traffic allocated to each of the original equivalent paths or differs from the number of pieces of traffic allocated to each of the original equivalent paths by one piece.

* * * * *